United States Patent
Kanja

(10) Patent No.: US 10,579,043 B2
(45) Date of Patent: Mar. 3, 2020

(54) MACHINING TIME PREDICTION DEVICE, CUTTING SYSTEM, AND MACHINING TIME PREDICTION METHOD

(71) Applicant: Roland DG Corporation, Hamamatsu-shi, Shizuoka (JP)

(72) Inventor: Tetsuya Kanja, Hamamatsu (JP)

(73) Assignee: Roland DG Corporation, Shizuoka (JP)

( * ) Notice: Subject to any disclaimer, the term of this patent is extended or adjusted under 35 U.S.C. 154(b) by 0 days.

(21) Appl. No.: 16/084,984

(22) PCT Filed: Mar. 16, 2017

(86) PCT No.: PCT/JP2017/010589
§ 371 (c)(1),
(2) Date: Sep. 14, 2018

(87) PCT Pub. No.: WO2017/159772
PCT Pub. Date: Sep. 21, 2017

(65) Prior Publication Data
US 2019/0079488 A1    Mar. 14, 2019

(30) Foreign Application Priority Data
Mar. 17, 2016 (JP) ................................. 2016-053629

(51) Int. Cl.
G05B 19/4069 (2006.01)
G05B 19/4063 (2006.01)
(Continued)

(52) U.S. Cl.
CPC ......... *G05B 19/4069* (2013.01); *B23Q 17/09* (2013.01); *G05B 19/19* (2013.01);
(Continued)

(58) Field of Classification Search
CPC ........................... G05B 19/4069; G05B 19/19
(Continued)

(56) References Cited

U.S. PATENT DOCUMENTS

| 4,550,375 A | 10/1985 | Sato et al. |
| 6,163,124 A * | 12/2000 | Ito .............................. B25J 9/16 318/560 |

(Continued)

FOREIGN PATENT DOCUMENTS

| JP | 58-143944 A | 8/1983 |
| JP | 2-30457 A | 1/1990 |

(Continued)

OTHER PUBLICATIONS

Official Communication issued in International Patent Application No. PCT/JP2017/010589, dated Jun. 13, 2017.
(Continued)

*Primary Examiner* — David Luo
(74) *Attorney, Agent, or Firm* — Keating & Bennett, LLP

(57) ABSTRACT

To highly accurately predict remaining machining time required for cutting, a controller of a machining time prediction device includes a storage in which a machining program is stored, a simulator that performs a simulation in which a cutting machine cuts a workpiece in accordance with the machining program to generate a control pattern in which control information of a spindle and a holder is recorded, a machining time calculator that generates, based on the control pattern, a machining time table in which remaining machining time for each step of the machining program, a machining time acquirer that acquires a step of the machining program cutting of which is performed by the cutting machine at a current time point and acquires the remaining machining time for the step of the machining program, which has been acquired, from the machining time
(Continued)

table, and a display controller that displays the remaining machining time that has been acquired by the machining time acquirer on a display screen.

9 Claims, 10 Drawing Sheets

(51) Int. Cl.
B23Q 17/09 (2006.01)
G05B 19/19 (2006.01)
G05B 19/4155 (2006.01)

(52) U.S. Cl.
CPC ..... *G05B 19/4063* (2013.01); *G05B 19/4155* (2013.01); *G05B 2219/31407* (2013.01); *G05B 2219/34494* (2013.01); *G05B 2219/36219* (2013.01)

(58) Field of Classification Search
USPC ........................................ 318/569, 567, 560
See application file for complete search history.

(56) References Cited

U.S. PATENT DOCUMENTS

| | | | |
|---|---|---|---|
| 8,589,122 B2* | 11/2013 | Nagatsuka | G05B 19/4069 703/1 |
| 8,938,316 B2* | 1/2015 | Otsuki | G05B 19/4069 700/160 |
| 2005/0228533 A1 | 10/2005 | Hioki et al. | |
| 2012/0296462 A1 | 11/2012 | Otsuki et al. | |

FOREIGN PATENT DOCUMENTS

| | | |
|---|---|---|
| JP | 04-314104 A | 11/1992 |
| JP | 2002-73126 A | 3/2002 |
| JP | 2005-301440 A | 10/2005 |
| JP | 2007-25945 A | 2/2007 |
| JP | 2012-243152 A | 12/2012 |

OTHER PUBLICATIONS

Altintas, Y. et al.; "Prediction of Part Machining Cycle Times Via Virtual CNC"; CIRP Annals—Manufacuring Technology; vol. 64; No. 1; Apr. 28, 2015; pp. 361-364.

* cited by examiner

MACHINING TIME PREDICTION DEVICE, CUTTING SYSTEM, AND MACHINING TIME PREDICTION METHOD

BACKGROUND OF THE INVENTION

1. Field of the Invention

The present invention relates to a machining time prediction device, a cutting system, and a machining time prediction method.

2. Description of the Related Art

Conventionally, a cutting machine which cuts a workpiece using a machining tool that rotates has been known. In a cutting machine of this type, a machining program including a plurality of processing steps is generated in advance. Moreover, based on each processing step of the machining program, a relative positional relationship between the workpiece and the machining tool is three-dimensionally changed to cause the machining tool to contact the workpiece at a predetermined angle, and thereby, the workpiece is cut into a desired shape.

In such a cutting machine, prediction of remaining machining time which is required for cutting a workpiece is performed. For example, in the invention disclosed in Japanese Laid-open Patent Publication No. 2002-73126, machining time required from a time point at which cutting was started to a current cutting time point is measured and also it is determined which step of the entire machining program at what time point a processing step that is currently performed is. Then, a remaining time required for cutting is predicted from a result of the above-described measurement and a result of the above-described determination.

Incidentally, if steps of a machining program used for cutting a workpiece are roughly divided, the steps may be divided into a rough cutting process of cutting a workpiece into a rough shape that is similar to a desired shape by performing rough cutting and a finishing process of cutting a fine part after performing the rough process. A step of the machining program, which is included in the rough cutting process, requires a short processing time but a step of the machining program, which is included in the finishing process, requires a long processing time, as compared to the rough cutting process. In the invention disclosed in Japanese Laid-open Patent Publication No. 2002-73126, in the above-described rough cutting process, an error between the predicted remaining machining time and an actually required remaining machining time was large.

SUMMARY OF THE INVENTION

Preferred embodiments of the present invention provide machining time prediction devices, cutting systems, and machining time prediction methods, which each achieve a high prediction accuracy when a remaining machining time required for cutting is predicted.

A machining time prediction device according to a preferred embodiment of the present invention includes a spindle that rotates a machining tool and a holder that holds a workpiece and is movable relative to the spindle and predicts remaining machining time in which the workpiece is cut in a cutting machine that cuts the workpiece using the machining tool, based on a machining program in which a plurality of process steps is recorded. The machining time prediction device includes a display screen and a controller coupled to the display screen. The controller is configured or programmed to include a storage or memory, a simulator, a machining time calculator, a machining time acquirer, and a display controller. In the storage or memory, the machining program is stored. The simulator performs a simulation in which the cutting machine cuts the workpiece in accordance with the machining program to generate a control pattern in which control information of the spindle and the holder is recorded. The machining time calculator calculates, based on the control pattern, remaining machining time in each step of the machining program and generates a machining time table in which the remaining machining time for each step of the machining program is recorded. The machining time acquirer acquires a step of the machining program cutting of which is performed by the cutting machine at a current time point and acquires the remaining machining time for the step of the machining program, which has been acquired, from the machining time table. The display controller displays the remaining machining time that has been acquired by the machining time acquirer on the display screen.

Using the machining time prediction device, each step, which is each step in which the cutting machine cuts the workpiece and which the cutting machine actually performs, is artificially performed by the simulator in accordance with the machining program that the cutting machine actually uses to generate a control pattern. The control pattern that has been generated by the simulator is the same as the control pattern generated by the cutting machine when the cutting machine performs cutting. Therefore, the remaining machining time in each step in the machining time table that has been generated based on the control pattern that has been generated by the simulator is the same or substantially the same as the remaining machining time that has been actually required in each step that is performed by the cutting machine. Accordingly, for example, even in a step in the machining program included in a rough cutting step, it is possible to further reduce an error between the remaining machining time that has been predicted by the machining time prediction device and the remaining machining time that has been actually required. Therefore, it is possible to predict highly accurate remaining machining time.

A machining time prediction method according to a preferred embodiment of the present invention is a machining time prediction method in which, in a cutting machine which includes a spindle that rotates a machining tool and a holder that holds a workpiece and is movable relative to the spindle and cuts the workpiece using the machining tool, based on a machining program in which a plurality of process steps is recorded, remaining machining time during which the workpiece is cut is predicted. The machining time prediction method includes a simulation step, a machining time calculation step, a machining time acquisition step, and a display step. In the simulation step, a simulation in which the cutting machine cuts the workpiece is performed in accordance with the machining program to generate a control pattern in which control information of the spindle and the holder is recorded. In the machining time calculation step, based on the control pattern, remaining machining time in each step of the machining program is calculated and a machining time table in which remaining machining time for each step of the machining program is recorded is generated. In the machining time acquisition step, a step of the machining program cutting of which is performed by the cutting machine at a current time point is acquired and the remaining machining time for the step of the machining program, which has been acquired, is acquired from the machining time table. In the display step, the remaining machining time that has been acquired in the machining time acquisition step is displayed on a display screen.

According to preferred embodiments of the present invention, machining time prediction devices, cutting system, and machining time prediction methods each achieve high prediction accuracy when remaining machining time required for cutting is predicted.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Cutting systems according to preferred embodiments of the present invention will be described with reference to the accompanying drawings. Note that, as a matter of course, the preferred embodiments described herein are not intended to be particularly limiting the present invention. Also, members and features that have the same function are denoted by the same reference symbol and redundant description will be omitted or simplified, as appropriate.

Figure 1:
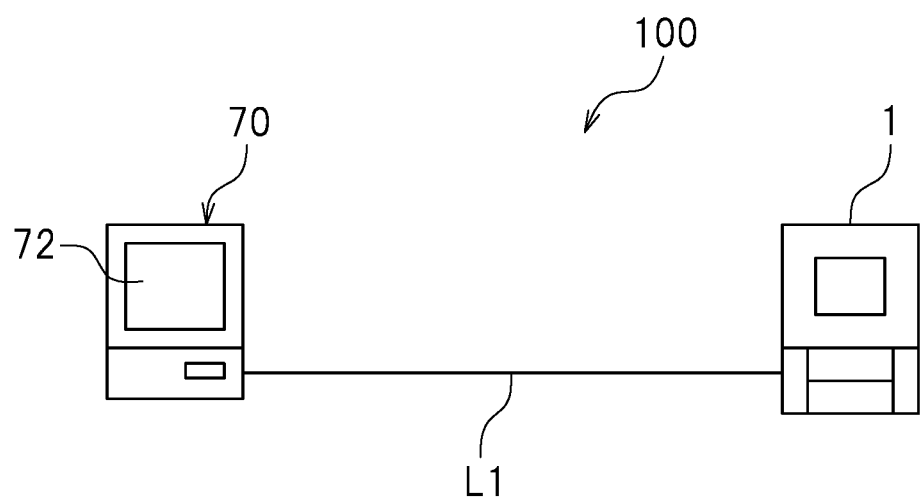
FIG. 1 is a block diagram illustrating a cutting system according to a preferred embodiment of the present invention.

FIG. 1 is a block diagram illustrating a cutting system 100 according to the present preferred embodiment. As illustrated in FIG. 1, the cutting system 100 according to this preferred embodiment includes a cutting machine 1 and a machining time prediction device 70. In this case, first, the cutting machine 1 will be described and, thereafter, the machining time prediction device 70 will be described.

Figure 2:
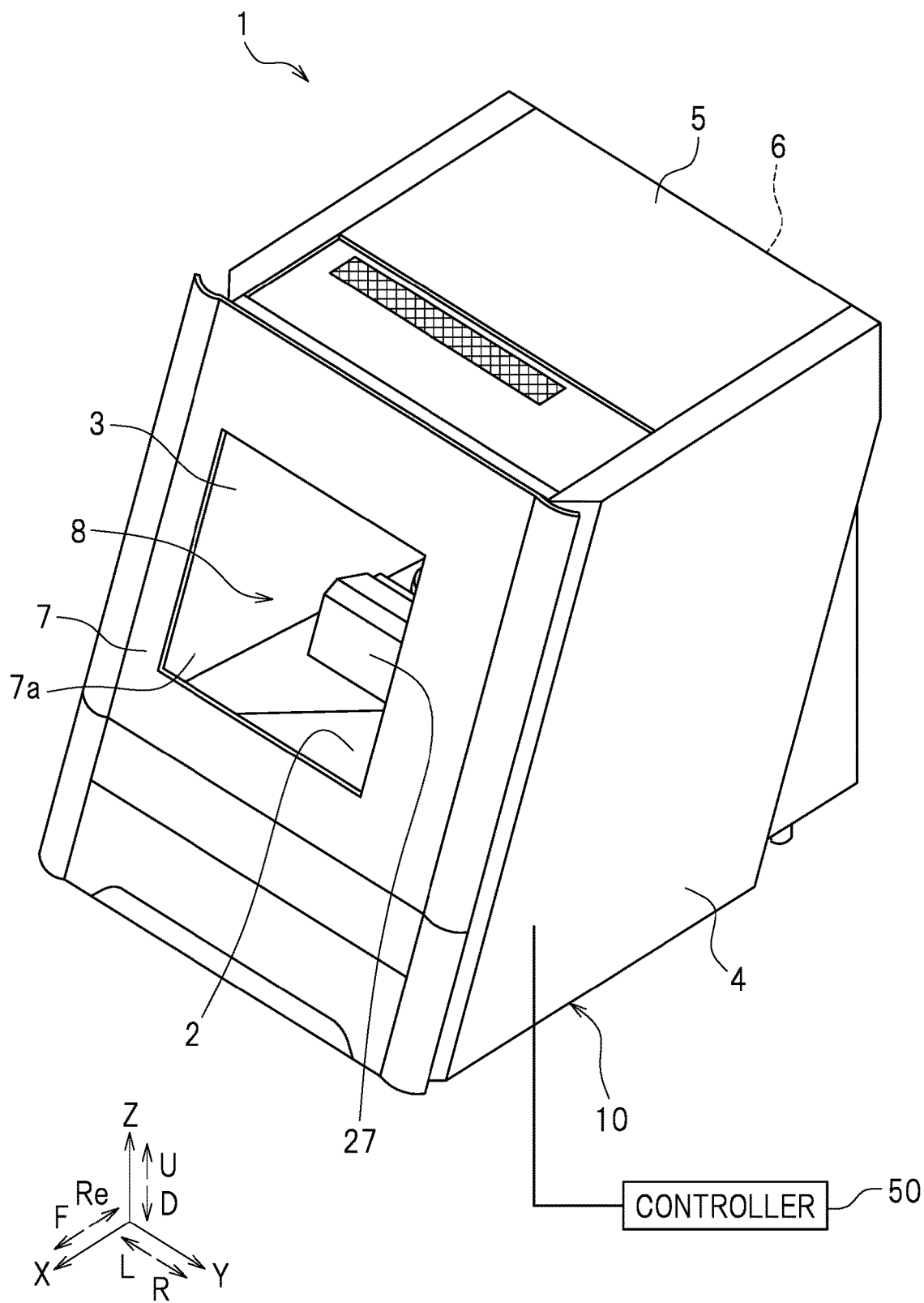
FIG. 2 is a perspective view illustrating a cutting machine according to a preferred embodiment of the present invention.

FIG. 2 is a perspective view illustrating the cutting machine 1. As illustrated in FIG. 2, it is assumed that axes that are mutually orthogonal to one another are an X-axis, a Y-axis, and a Z-axis. It is assumed that the cutting machine 1 according to this preferred embodiment is placed on an XY-plane defined by the X-axis and the Y axis. In the description below, a left side and a right side are a left side and a right side when the cutting machine 1 is viewed facing a front cover 7 of FIG. 2. Also, when the cutting machine 1 is viewed facing the front cover 7 of FIG. 2, a side closer to the cutting machine 1 is a rear side and a side farther from the cutting machine 1 is a front side. In the drawings which will be presented hereinafter, the left side will be denoted by L, the right side will be denoted by R, the front side will be denoted by F, the rear side will be denoted by Re, an upper side will be denoted by U, and a down side will be denoted by D. However, these are directions merely used for convenience of description and are not intended to be limiting a setting condition of the cutting machine 1.

Figure 3:
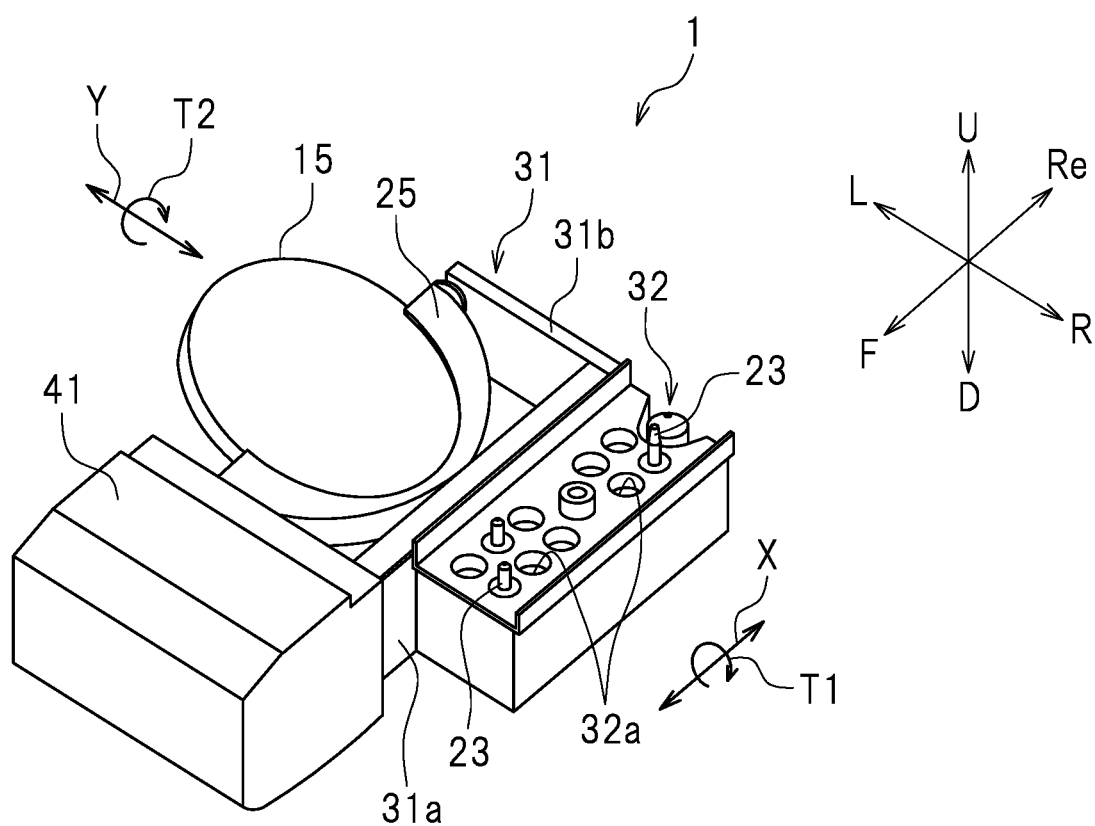
FIG. 3 is a perspective view illustrating a holder and a tool magazine.

The cutting machine 1 is used to cut a workpiece 15 (see FIG. 3). The workpiece 15 is, for example, a material for an artificial tooth. In this case, the workpiece 15 is formed of a material, such as ceramics, resin, or the like. However, the material of the workpiece 15 is not particularly limited.

As illustrated in FIG. 2, the cutting machine 1 preferably has a box shape, for example. Particularly, the cutting machine 1 includes a case 10 including a base 2, a left outer wall 3, a right outer wall 4, a top surface 5, and a rear surface 6 and the front cover 7. A front side of the case 10 is opened. The left outer wall 3 extends upward at a left end of the base 2. The right outer wall 4 extends upward at a right end of the base 2. The rear surface 6 extends upward in a rear end of the base 2. The rear surface 6 is connected to a rear end of the left outer wall 3 and a rear end of the right outer wall 4. The top surface 5 is located above the base 2. The top surface 5 is connected to an upper end of the left outer wall 3, an upper end of the right outer wall 4, and an upper end of the rear surface 6. In this preferred embodiment, an internal space 8 is defined by the base 2, the left outer wall 3, the right outer wall 4, the top surface 5, and the rear surface 6. The internal space 8 is a processing area in which cutting is performed on the workpiece 15 (see FIG. 3).

As illustrated in FIG. 2, the front cover 7 is able to be freely opened and closed by moving in an up-and-down direction at a front end of the left outer wall 3 and a front end of the right outer wall 4. A window 7a is provided in the front cover 7. An operator is able to visually recognize the internal space 8 through the window 7a.

Next, a holder 25 that holds the workpiece 15 and a tool magazine 32 that accommodates a plurality of machining tools 23 will be described. FIG. 3 is a perspective illustrating the holder 25 and the tool magazine 32. As illustrated in FIG. 3, the cutting machine 1 includes the holder 25 that holds the workpiece 15, a support 31 linked to the holder 25, and the tool magazine 32 which preferably has a box shape and accommodates the plurality of machining tools 23. The holder 25, the support 31, and the tool magazine 32 are provided in the internal space 8 (see FIG. 2). In this preferred embodiment, as described above, a shape of the workpiece 15 is a disc shape, for example. The holder 25 preferably has an arc shape, for example, which enables the holder 25 to hold the disc-shaped workpiece 15 in this example. Although illustration is omitted, a first rotatory shaft is connected to a front of the holder 25 and a second rotary shaft is connected to a rear of the holder 25. The first rotary shaft is connected to a first driver 41 provided in the front of the holder 25. The first driver 41 is, for example, a motor. The first driver 41 rotates the above-described first rotary shaft in a direction T1 around the X-axis. In the above-described configuration, when the above-described first rotary shaft is rotated by the first driver 41 in the direction T1, the holder 25 is rotated in the direction T1. Thus, it is possible to rotate the workpiece 15 in the direction T1. Also, although illustration is omitted, the support 31 is connected to a second driver 42 (see FIG. 5) and is moved in a front-and-rear direction by the second driver 42. Thus, the workpiece 15 and the holder 25 are connected to the second driver 42 via the support 31 and are moved in the front-and-rear direction via the support 31. Furthermore, the support 31 is connected to a third driver 43 (see FIG. 5) and is rotated by the third driver 43 in a direction T2 around the Y-axis. Thus, the workpiece 15 is rotated in the direction T2 via the holder 25. Note that the second driver 42 and the third driver 43 include, for example, motors.

In this preferred embodiment, the support 31 preferably has an L-shape. The support 31 includes a first plate 31a that extends in an X-axis direction and a second plate 31b that extends from a rear end of the first plate 31a in a Y-axis direction. The second plate 31b of the support 31 supports the above-described second rotary shaft. The tool magazine 32 is fixed to the first plate 31a of the support 31. A plurality of holes 32a are provided in an upper surface of the tool magazine 32 and the machining tools 23 are inserted through the holes 32a in a state in which upper portions 23a (see FIG. 4) of the machining tools 23 are exposed. Note that, in replacing the machining tool 23, the upper portion 23a of the machining tool 23 is gripped by a spindle 33 (see FIG. 4) which will be described later.

Figure 4:
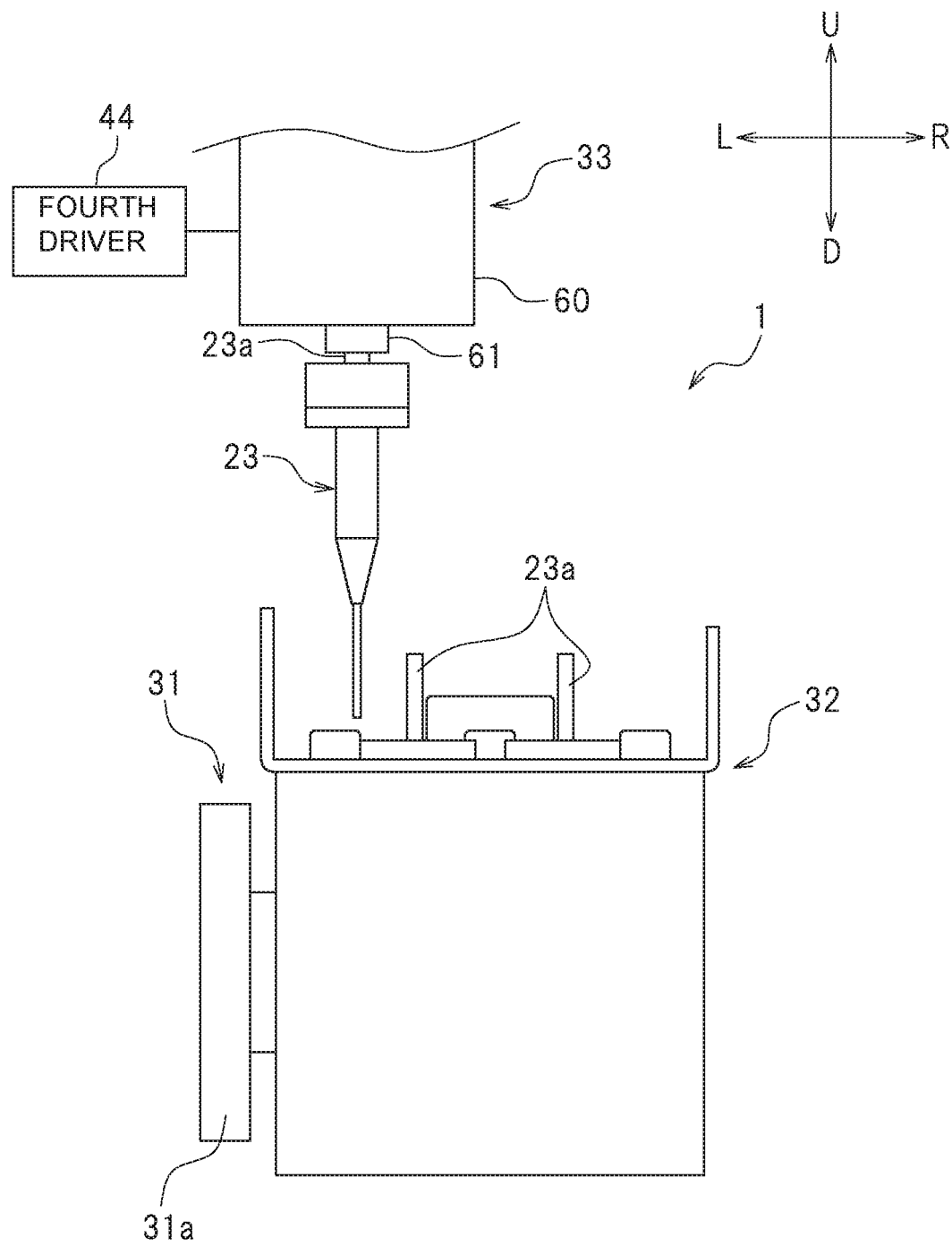
FIG. 4 is a front view illustrating a spindle and a tool magazine.

Next, the spindle 33 will be described. FIG. 4 is a front view illustrating the spindle 33. As illustrated in FIG. 4, the cutting machine 1 includes the spindle 33. In the internal space 8 (see FIG. 2), the spindle 33 extends in the up-and-down direction. The spindle 33 grips the machining tool 23. The spindle 33 rotates the machining tool 23. The spindle 33 is able to three-dimensionally move relative to the workpiece 15. In this case, the spindle 33 three-dimensionally moves, and thus, the spindle 33 moves relative to the workpiece 15. However, a configuration in which the spindle 33 is fixed and the workpiece 15 moves, so that the spindle 33 moves relative to the workpiece 15 may be used.

The spindle 33 is connected to a fourth driver 44. The spindle 33 is moved by the fourth driver 44 in the front-and-rear direction, the left-and-right direction, and the up-and-down direction. The fourth driver 44 is not particularly limited, but may be, for example, a motor. The spindle 33 includes a housing and a gripper 61 that grips the upper portion 23a of the machining tool 23. In replacing the machining tool 23, the spindle 33 returns the machining tool 23 that the spindle 33 currently holds to a predetermined position of the tool magazine 32. Thereafter, the spindle 33 moves such that the gripper 61 is located right above an upper portion 23a of the machining tool 23 that is to be newly gripped. Then, the spindle 33 moves downward toward the upper portion 23a of the machining tool 23 in a state in which the gripper 61 is opened and the gripper 61 is closed to grip the upper portion 23a of the machining tool 23. Thereafter, the spindle 33 moves toward the workpiece 15 (see FIG. 3) in order to start cutting. Although illustration is omitted, the spindle 33 is connected to a driver that rotates the machining tool 23 in a state in which the spindle 33 grips the machining tool 23.

Figure 5:
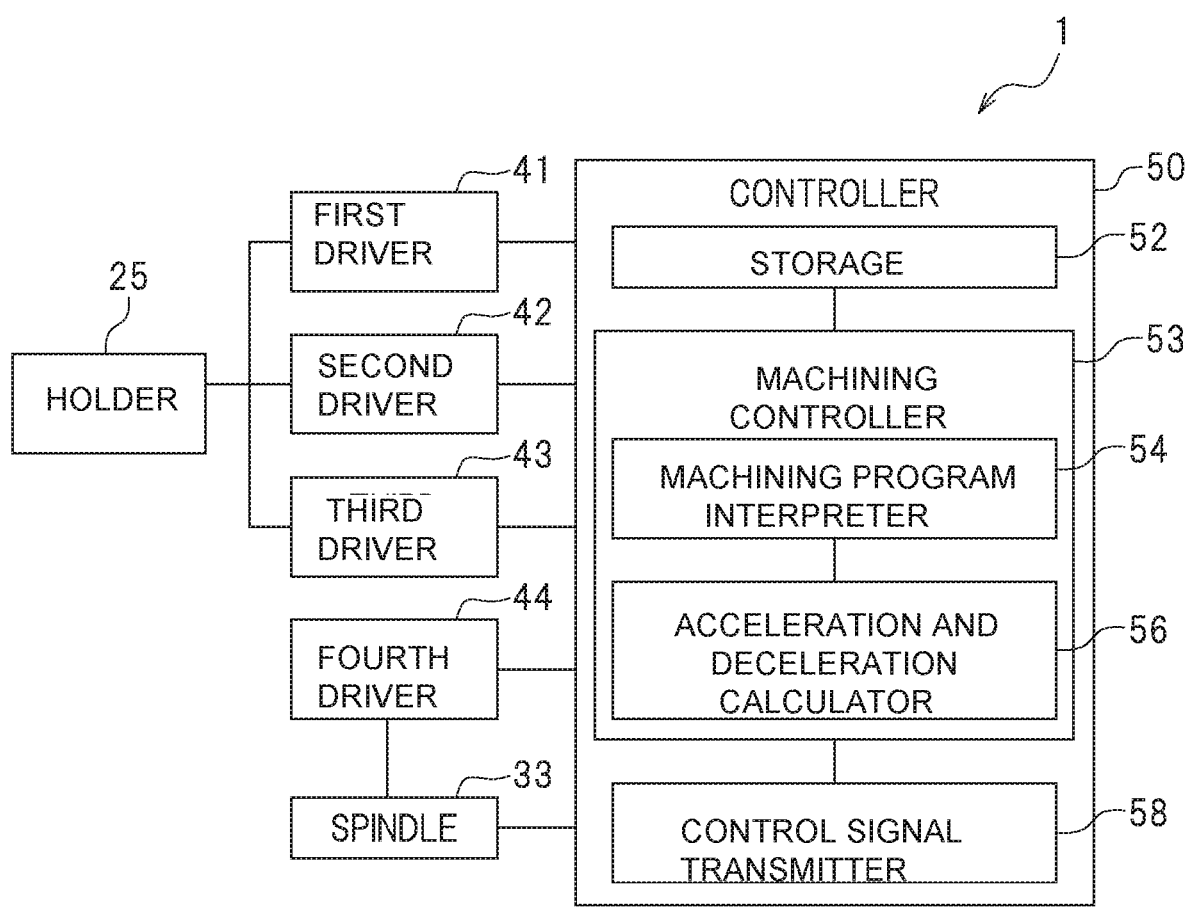
FIG. 5 is a block diagram illustrating a cutting machine.

Next, a controller 50 will be described. FIG. 5 is a block diagram of the cutting machine 1. A cutting machine according to this preferred embodiment includes a controller 50. The controller 50 is included in the cutting machine 1. However, an arrangement position or location of the controller 50 is not particularly limited. The controller 50 preferably is a computer and includes a central processing unit (CPU), a ROM in which a program or the like that is executed by the CPU, a RAM, or the like. Note that the program that is stored in the ROM is a so-called firmware.

As illustrated in FIG. 5, the controller 50 is connected to the first to fourth drivers 41 to 44 and the spindle 33. The controller 50 controls the first driver 41 and controls rotation in the direction T1 (see FIG. 3) around the X-axis in the holder 25. The controller 50 controls the second driver 42 and controls move in the front-and-rear direction in the holder 25. The controller 50 controls the third driver 43 and controls rotation in the direction T2 (see FIG. 3) around the Y-axis in the holder 25. Also, the controller 50 controls the fourth driver 44 and controls move of the spindle 33 in the front-and-rear direction and the left-and-right direction. The controller 50 controls the spindle 33 and performs control related to rotation of the spindle 33 and control related to gripping of the machining tool 23 in the spindle 33.

In this preferred embodiment, as illustrated in FIG. 3, the cutting machine 1 cuts the workpiece 15 using the plurality of machining tools 23, based on the machining program to generate a desired workpiece. The machining program is so-called NC data (an NC program). The machining program is a program in which a plurality of process steps in which an operation of the spindle 33 and an operation of the holder 25 that holds the workpiece 15 are defined by coordinate values is recorded. That is, the machining program includes a plurality of process steps. In accordance with the plurality of steps, the controller 50 controls operations of the spindle 33 and the holder 25 to cut the workpiece 15 by the machining tools 23 to generate a desired workpiece.

In this preferred embodiment, as illustrated in FIG. 5, the controller 50 is configured or programmed to include a storage or memory 52, a machining controller 53, and a control signal transmitter 58. Moreover, the machining controller 53 includes a machining program interpreter 54 and an acceleration and deceleration calculator 56. Each of the above-described elements preferably is realized by a program stored in the ROM, for example. The program is provided, for example, by another personal computer. Then, the controller 50 and another personal computer are connected to one another via a cable, such as a USB or the like, and a generated program is transferred to the controller 50. The transferred program is stored, for example, in the ROM included in the CPU of the controller 50. However, the program may be a program that is read, for example, from a recording medium, such as a compact disk (CD), a digital versatile disk (DVD), or the like. Note that the program may be downloaded via the Internet. Also, each of the above-described elements may be realized by a processor, a circuit, and like.

For example, the above-described machining program, and an acceleration parameter, an S-shape acceleration parameter, a smoothing parameter, and the like which will be described later have been recorded in the storage 52 in advance.

The machining controller 53 performs control related to cutting of the workpiece 15. In this preferred embodiment, the machining controller 53 generates a control pattern in which control information of the spindle 33 and the holder 25 is recorded in accordance with the machining program. In this case, control related to cutting by the machining controller 53 is realized by the machining program interpreter 54 and the acceleration and deceleration calculator 56. The machining program interpreter 54 interprets the machining program stored in the storage 52. Particularly, the machining program interpreter 54 reads the machining program stored in the storage 52. Then, the machining program interpreter 54 calculates positional information of the spindle 33 and the holder 25 in each step from coordinate values in each step of the read machining program. The positional information is acquired along a time series.

The acceleration and deceleration calculator 56 calculates a control pattern in which control information of the spindle 33 and the holder 25 that are controlled by the first to fourth drivers 41 to 44 is recorded from the positional information of the spindle 33 and the holder 25, which is positional information that has been calculated by the machining program interpreter 54. The control pattern is a control pattern related to the first to fourth drivers 41 to 44 and also is a control pattern in which control information that controls positions of the spindle 33 and the holder 25. In this case, for example, the acceleration and deceleration calculator 56 causes an interruption to occur in each predetermined interval (of, for example, about 250 µs) and calculates a move angle of each of respective motors of the first to fourth drivers 41 to 44 that move between one interruption and an interruption that occurs next in time. Note that, in this preferred embodiment, when a control pattern is generated, the acceleration parameter stored in the storage 52 is used. Furthermore, the control pattern is a control pattern after S-shape acceleration control and smoothing control have been performed.

Figure 6A:
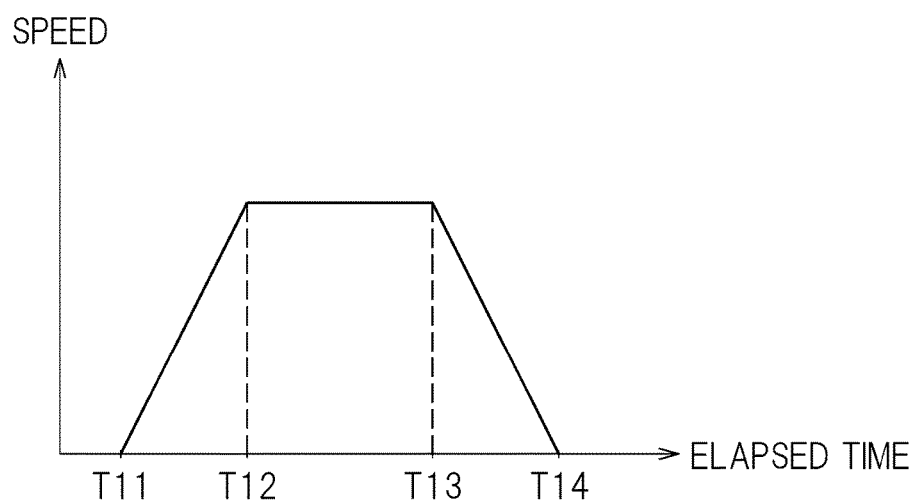
FIG. 6A is a graph illustrating an example of a relationship between an elapsed time and moving speed of a spindle when the spindle moves before S-shape acceleration control is performed and FIG. 6B is a graph illustrating an example of a relationship between an elapsed time and moving speed of the spindle when the spindle moves after S-shape acceleration control has been performed.
Figure 6B:
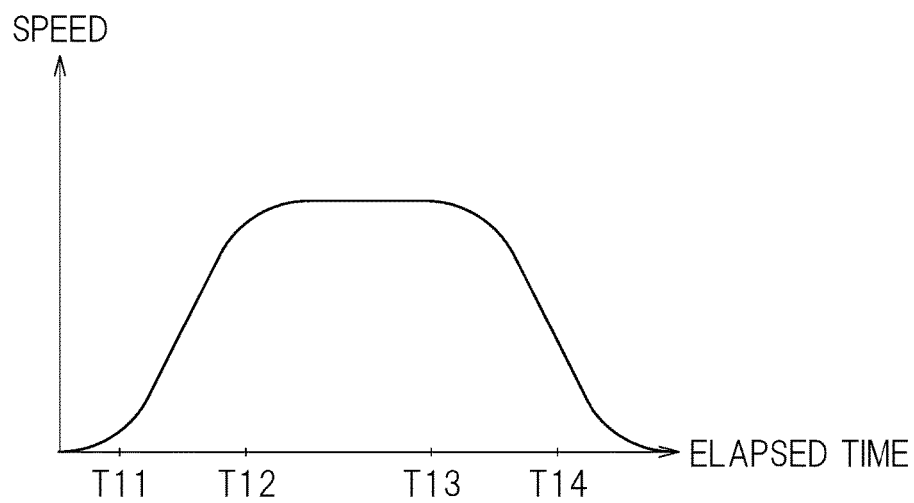

S-shape acceleration control is to correct each acceleration such that the spindle 33 and the holder 25 are smoothly accelerated and decelerated in continuous acceleration. FIG. 6A is a graph illustrating an example of a relationship between an elapsed time and moving speed of the spindle 33 when the spindle 33 moves in the internal space 8 before S-shape acceleration control is performed. FIG. 6B is a graph illustrating a state after S-shape acceleration control has been performed on the moving speed of the spindle 33 in the elapsed time. In FIGS. 6A and 6B, the abscissa indicates the elapsed time and the ordinate indicates the speed. It is assumed that, in the control pattern, as illustrated in FIG. 6A, a relationship between the elapsed time in a move of the spindle 33 and the moving speed of the spindle 33 has been achieved. In this case, in time T11 to T14, a rapid acceleration change occurs. When a rapid acceleration change occurs, a load applied to the first to fourth drivers 41 to 44 increases. Then, S-shape acceleration control is performed, and thus, correction is performed such that a rapid acceleration change does not occur. By performing S-shape acceleration control, as illustrated in FIG. 6B, a smooth rapid change is achieved. Note that S-shape acceleration control is performed using the S-shape acceleration parameter that has been stored in the storage 52 in advance. A different value is set for the S-shape acceleration parameter depending on a machine type.

Figure 7A:
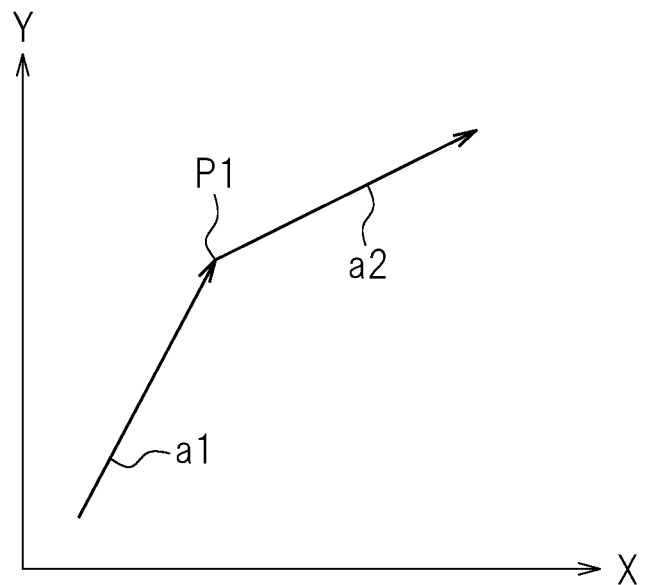
FIG. 7A is a graph illustrating an example of transition of a position of a spindle before smoothing control is performed and FIG. 7B is a graph illustrating an example of transition of the position of the spindle after smoothing control has been performed.
Figure 7B:
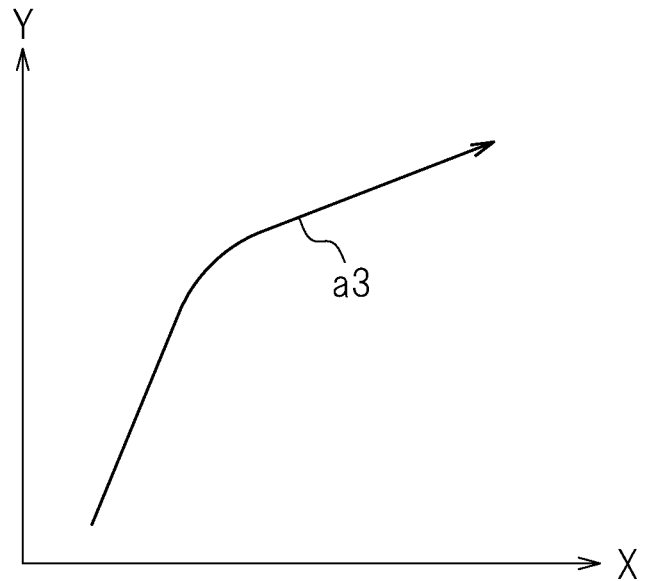

Smoothing control is control in which two consecutive paths (paths each of which indicates a position) of the control pattern are made into a single smooth curved path. FIG. 7A is a graph illustrating an example of transition of a position of the spindle 33 before smoothing control is performed. Relative to the graph of transition of the position of the spindle 33 illustrated in FIG. 7A, FIG. 7B is a graph illustrating transition of the position of the spindle 33 after smoothing control has been performed. In FIGS. 7A and 7B, the abscissa indicates the position of the spindle 33 in the X-axis direction and the ordinate indicates the position of the spindle 33 in the Y-axis direction. For example, it is assumed that the position of the spindle 33 transitions in accordance with the control pattern as illustrated in FIG. 7A. In this case, a path a1 and a path a2 are not smoothly linked at a point P1, and therefore, a load applied to the spindle 33 increases. Therefore, as illustrated in FIG. 7B, positions of the path a1 and the path a2 are corrected by performing smoothing control and a smooth curved path a3 is achieved. A move indicated by the path a3 is performed by the spindle 33, and thus, it is possible to reduce the load applied to the spindle 33. Note that smoothing control is performed using the smoothing parameter that has been stored in the storage 52 in advance. A different value is set for the smoothing parameter depending on a machine type. As has been described above, the control pattern on which S-shape acceleration control and smoothing control have been performed is able to be achieved by the acceleration and deceleration calculator 56.

As illustrated in FIG. 5, the control signal transmitter 58 transmits a control signal to the first to fourth drivers 41 to 44 as appropriate in accordance with the control pattern that has been achieved by the acceleration and deceleration calculator 56. Note that angles of the motors of the first to fourth drivers 41 to 44 that have received the control signal are controlled in accordance with the control signal. Then, in accordance with the control pattern that has been achieved by the acceleration and deceleration calculator 56, the spindle 33 and the holder 25 are moved, and thus, cutting of the workpiece 15 is preformed to produce a desired workpiece.

The cutting machine 1 according to this preferred embodiment has been described above. Next, the machining time prediction device 70 illustrated in FIG. 1 will be described. The machining time prediction device 70 according to this preferred embodiment is a device that predicts remaining machining time (which will be hereinafter referred to as merely "remaining machining time") which is required to cut the workpiece 15 which is performed by the cutting machine 1. As illustrated in FIG. 1, the machining time prediction device 70 is connected to the cutting machine 1 by a line L1 such that a wired communication is possible. Note that the cutting machine 1 and the machining time prediction device 70 may be connected to one another such that a wireless communication is possible.

Figure 8:
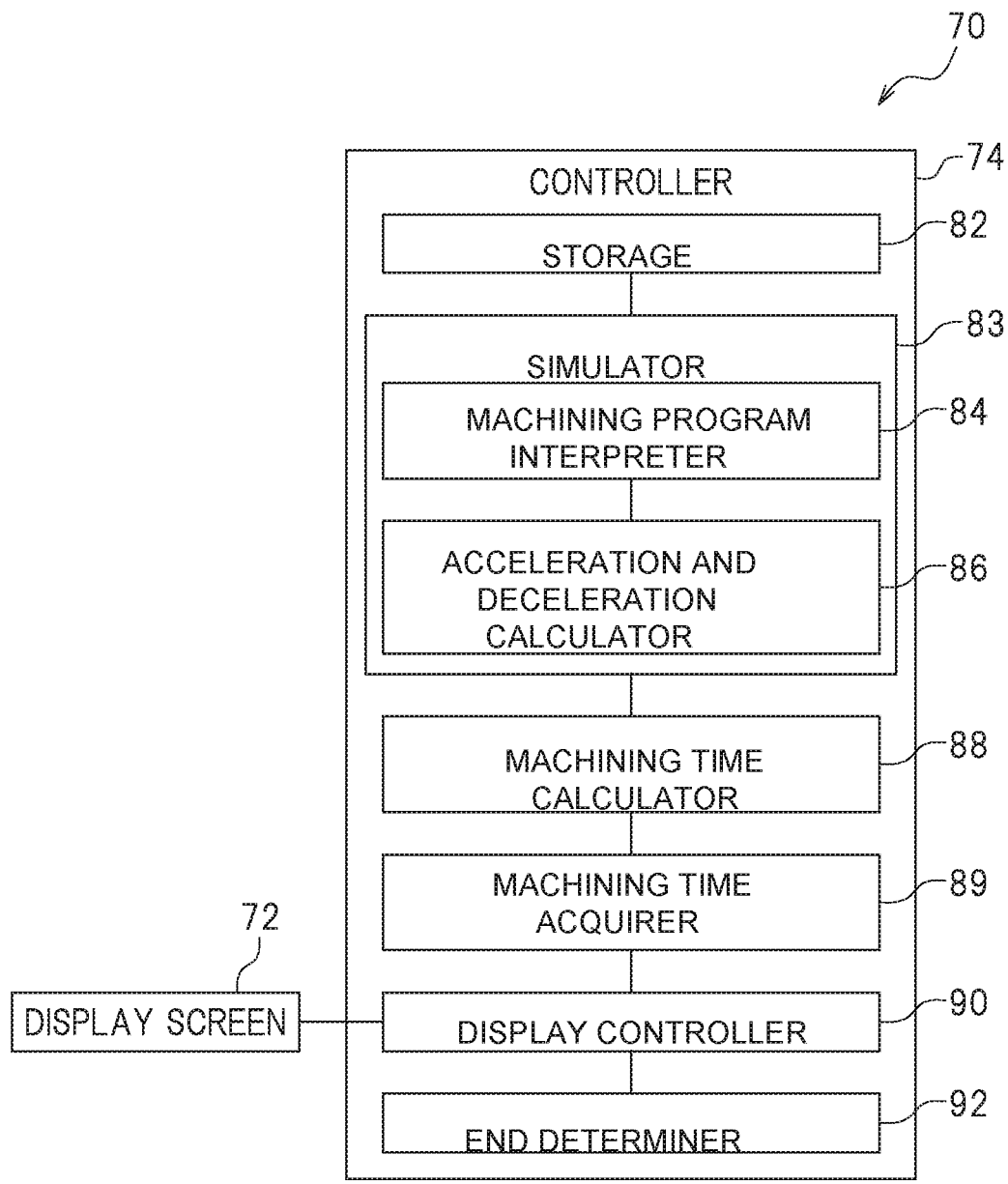
FIG. 8 is a block diagram illustrating a machining time prediction device according to a preferred embodiment of the present invention.

FIG. 8 is a block diagram illustrating the machining time prediction device 70. As illustrated in FIG. 8, the machining time prediction device 70 includes a display screen 72 and a controller 74. As illustrated in FIG. 1, the display screen 72 is, for example, a display and a remaining time for cutting is displayed thereon. Note that the display screen 72 may be an operation screen (not illustrated) which is provided in the cutting machine 1 and is used by the operator to operate the cutting machine 1.

The controller 74 is a computer and includes a CPU, a ROM that stores a program or the like that is executed by the CPU, a RAM, and the like. In this preferred embodiment, the controller includes a storage 82, a simulator 83, a machining time calculator 88, a machining time acquirer 89, a display controller 90, and an end determiner 92. The simulator 83 includes a machining program interpreter 84 and an acceleration and deceleration calculator 86. Each of the above-described elements is realized by the program stored in the ROM. The program is read, for example, from a recording medium, such as a CD, a DVD, or the like. Note that the program may be downloaded via the Internet. Also, each of the above-described elements may be realized by a processor, a circuit, and the like.

In the storage 82, the machining program, the acceleration parameter, the S-shape acceleration parameter, and the smoothing parameter are stored. The machining program, the acceleration parameter, and the S-shape acceleration parameter, and the smoothing parameter stored in the storage 82 are similar to the machining program, the acceleration parameter, the S-shape acceleration parameter, and the smoothing parameter stored in the storage 52 of the cutting machine 1, respectively. Note that the storage 82 of the controller 74 of the machining time prediction device 70 and the storage 52 of the controller 50 of the cutting machine 1 may be separate storages or memories and also may be a single common storage or memory.

The simulator 83 simulates cutting of the workpiece 15 (see FIG. 3) which is performed by the cutting machine 1. In this case, the simulator 83 performs a simulation in which the cutting machine 1 cuts the workpiece 15 in accordance with the machining program stored in the storage 82 to generate a control pattern in which control information of the spindle 33 (see FIG. 4) and the holder 25 (see FIG. 3) is recorded. In this case, the simulator artificially performs similar control to control of the machining controller 53 of the cutting machine 1 in a virtual space. In this preferred embodiment, the simulator 83 is realized by the machining program interpreter 84 and the acceleration and deceleration calculator 86.

As illustrated in FIG. 8, the machining program interpreter 84 of the simulator 83 of the machining time prediction device 70 artificially performs the same control as control of the machining program interpreter 54 (see FIG. 5) of the machining controller 53 of the cutting machine 1. That is, the machining program interpreter 84 interprets the machining program and calculates the positional information of the spindle 33 and the holder 25 in each step of the machining program. In this case, for a source code of the machining program interpreter 84, the same source code as that of the machining program interpreter 54 of the cutting machine 1 is used. Similarly, the acceleration and deceleration calculator 86 of the simulator 83 artificially performs the same control as control of the acceleration and deceleration calculator 56 of the machining controller 53 of the cutting machine 1. That is, the acceleration and deceleration calculator 86 generates a control pattern by calculating an acceleration when the spindle 33 and the holder 25 move from the above-described positional information that has been calculated by the machining program interpreter 84. In this case, a source code of the acceleration and deceleration calculator 86 of the simulator is the same source code as that of the acceleration and deceleration calculator 56 of the machining controller 53. That is, a control pattern on which the above-described S-shape acceleration control and the above-described smoothing control have been performed may be achieved by the acceleration and deceleration calculator 86 of the simulator 83.

Figure 9:
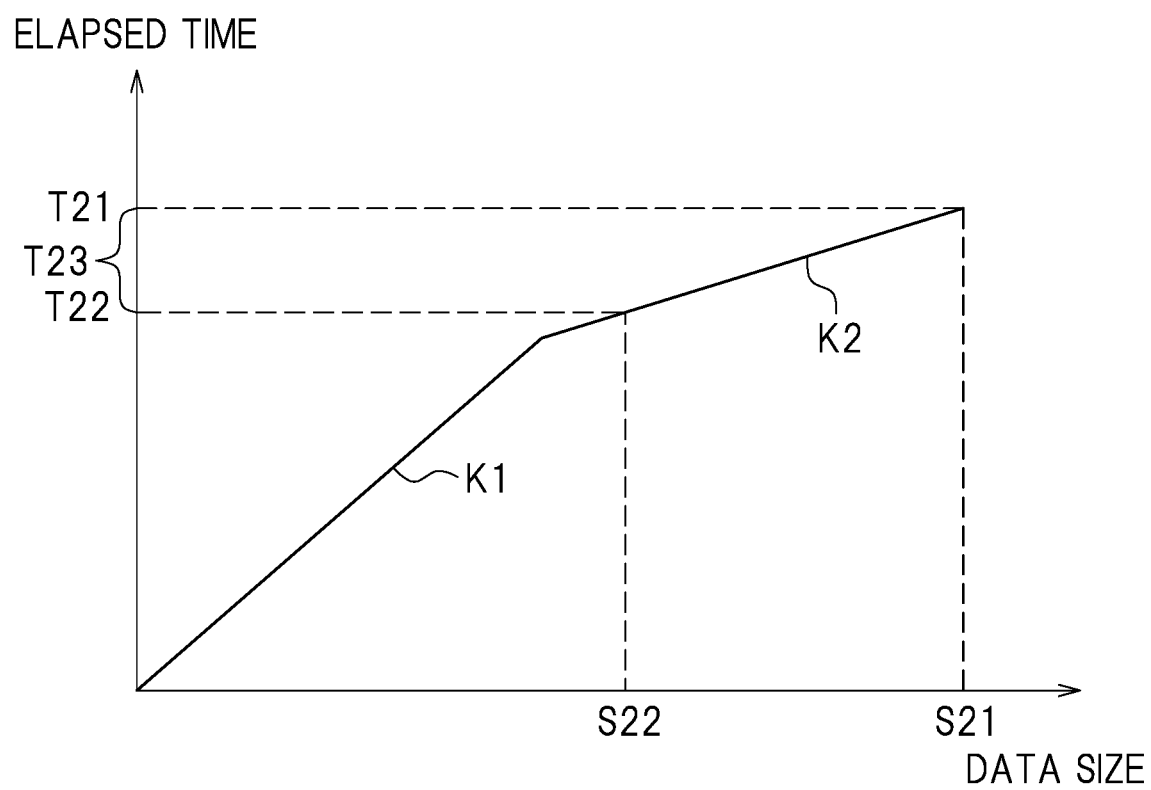
FIG. 9 is a graph illustrating a relationship between a data size of a processed machining program and an elapsed time.

As illustrated in FIG. 8, the machining time calculator calculates remaining machining time in each step of the machining program, based on the control pattern that has been generated by the acceleration and deceleration calculator 56 of the simulator 83. Then, the machining time calculator 88 generates a machining time table in which the remaining machining time for each step of the machining program is recorded. FIG. 9 is a graph illustrating a relationship between a data size of the processed machining program and an elapsed time. Note that, in FIG. 9, the abscissa indicates the data size (the number of bytes) of the processed machining program and the ordinate indicates the elapsed time. Also, in FIG. 9, a reference symbol K1 denotes a rough cutting process and a reference symbol K2 denotes a finishing process. The machining time calculator 88 generates the machining time table, based on the graph illustrated in FIG. 9. In FIG. 9, a total data size (an entire data size of the machining program) of the machining program is a size S21 and total machining time (an entire machining time required for cutting) which is required for cutting is time T21. In this case, for example, it is assumed that the data size of the processed machining program that has been processed before a predetermined step of the machining program during cutting is a size S22 and the machining time required before the predetermined step is time T22. In this case, it is possible to estimate remaining time T23 when the data size of the processed machining program is the size S22 to be T23=T21−T22.

In this preferred embodiment, the machining time calculator 88 calculates the data size of the processed machining program for each step of the machining program and calculates remaining machining time for each data size. Then, the machining time calculator 88 records a relationship between the processed data size and the remaining machining time in a machining table. The machining time calculator 88 generates the above-described machining table.

As illustrated in FIG. 8, the machining time acquirer 89 acquires a step of the machining program cutting of which has been performed by the cutting machine 1 at a current time point. Then, the machining time acquirer 89 acquires remaining machining time for the step of the machining program, which has been acquired, from the machining time table. Note that detailed procedures used to acquire the remaining machining time will be described later.

The display controller 90 displays the remaining machining time that has been acquired by the machining time acquirer 89 on the display screen 72. The end determiner 92 determines whether or not cutting of the workpiece 15 by the cutting machine 1 has ended. In other words, the end determiner 92 determines whether or not a step of displaying the remaining machining time is to be terminated. Note that detailed procedures used in the end determiner 92 for determining whether or not cutting of the workpiece 15 has ended will be described later.

Figure 10:
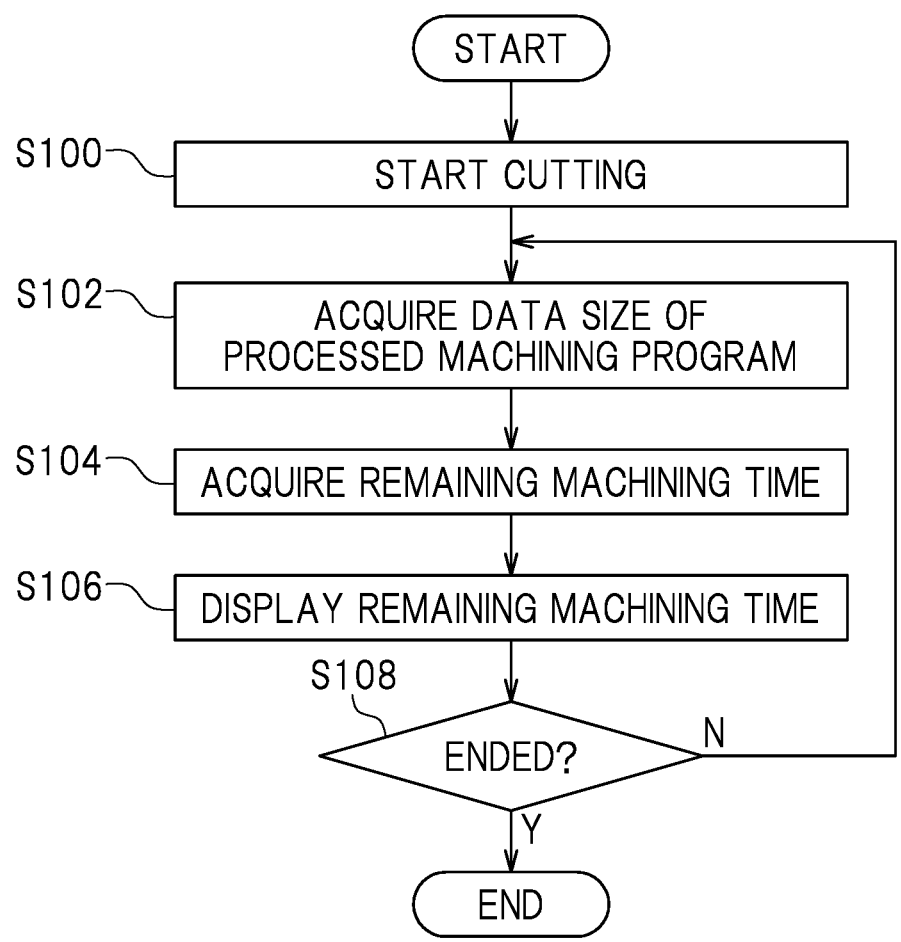
FIG. 10 is a flowchart illustrating procedures used to display remaining machining time.

Next, procedures in which the machining time prediction device 70 displays the remaining machining time will be described. FIG. 10 is a flowchart illustrating procedures used for displaying the remaining machining time. In this case, the procedures used to display the remaining machining time will be described using the flowchart of FIG. 10. Note that, in advance of performing the procedures illustrated in the flowchart of FIG. 10, a machining time table is generated by the simulator 83 of the machining time prediction device 70. It is assumed that the machining time table is stored in the storage 82 of the machining time prediction device 70.

First, in Step S100, the controller 50 of the cutting machine 1 starts cutting of the workpiece 15 in accordance with the machining program stored in the storage 52. In this case, a control pattern after S-shape acceleration control and smoothing control have been performed is generated by the acceleration and deceleration calculator 56 of the machining controller 53 of the cutting machine 1. Then, based on the control pattern, the first to fourth drivers 41 to 44 are controlled to control moving positions and moving speeds of the spindle 33 and the holder 25.

In Step S100, after cutting by the cutting machine 1 is started, in the Step S102, the machining time acquirer 89 of the machining time prediction device 70 acquires the data size of the processed machining program at a current time point from the cutting machine 1. In this case, for example, the machining time acquirer 89 transmits a data size acquisition signal to the controller 50 of the cutting machine 1.

Then, the controller 50 that has received the data size acquisition signal acquires a step of the machining program, which is currently performed, and calculates a data size of the machining program, which corresponds to the step of the machining program which has been processed. Thereafter, the controller 50 of the cutting machine 1 transmits the data size of the processed machining program to the machining time acquirer 89 of the machining time prediction device 70. Then, the machining time acquirer 89 acquires the data size of the processed machining program by receiving the data size of the processed machining program.

Next, in Step S104, the machining time acquirer 89 acquires remaining machining time. The machining time acquirer 89 acquires the remaining machining time in accordance with the data size of the processed machining program, which has been acquired in Step S102. Specifically, as described above, the machining time table that has been generated by the machining time calculator 88 is stored in the storage 82. The machining time acquirer 89 acquires the remaining machining time which corresponds to the data size of the processed machining program from the machining time table that has been generated by the machining time calculator 88.

Next, in Step S106, the display controller 90 displays the remaining machining time that has been acquired by the machining time acquirer 89 on the display screen 72. Then, in Step S108, the end determiner 92 determines whether or not cutting has ended. For example, the total data size of the machining program has been stored in the storage 82 of the machining time prediction device 70 in advance. In this preferred embodiment, the end determiner 92 compares the total data size of the machining program that has been stored in the storage 82 to the data size of the processed machining program, which has been acquired by the machining time acquirer 89 in Step S102. In this case, when the data size of the processed machining program matches the total data size of the machining program, the end determiner 92 determines that cutting by the cutting machine 1 has ended. If it has been determined that cutting has ended, display of the remaining machining time ends. On the other hand, if the data size of the processed machining program does not match the total data size of the machining program and is smaller than the total data size of the machining program, the end determiner 92 determines that cutting by the cutting machine 1 has continued. In this case, the process returns to Step S102 and the step of acquiring the data size of the processed machining program is performed again.

As has been described above, in this preferred embodiment, as illustrated in FIG. 8, each step which is a step in which the cutting machine 1 cuts the workpiece 15 (see FIG. 3) and which the cutting machine 1 actually performs is artificially performed by the simulator 83 in accordance with the machining program that the cutting machine 1 actually uses and thus a control pattern is generated. The control pattern that has been generated by the simulator 83 is the same as the control pattern generated by the machining controller 53 (see FIG. 5) of the cutting machine 1 when the cutting machine 1 performs cutting. Therefore, the remaining time in each step in the machining time table that has been generated based on the control pattern that has been generated by the simulator 83 is the same or substantially the same as the remaining machining time that has been actually required in each step that is performed by the cutting machine 1. Accordingly, even in a step in the machining program included in the rough cutting step K1 (see FIG. 9), it is possible to further reduce an error between the remaining machining time that has been predicted by the machining time prediction device 70 and the remaining machining time that has been actually required. Therefore, it is possible to predict highly accurate remaining machining time.

In this preferred embodiment, the simulator 83 includes the machining program interpreter 84 and the acceleration and deceleration calculator 86. The machining program interpreter 84 calculates positional information of the spindle 33 and the holder 25 in each step of the machining program that has been stored in the storage 82. The acceleration and deceleration calculator 86 generates a control pattern from the positional information that has been calculated by the machining program interpreter 84 by calculating acceleration when the spindle 33 and the holder 25 move. The machining program interpreter 84 of the machining time prediction device 70 artificially performs similar control to control of the machining program interpreter 54 (see FIG. 5) of the cutting machine 1 and the acceleration and deceleration calculator 86 of the machining time prediction device 70 artificially performs similar control to control of the acceleration and deceleration calculator 56 (see FIG. 5) of the cutting machine 1. In this preferred embodiment, the simulator 83 of the machining time prediction device 70 artificially performs the same control as control of the machining controller 53 (see FIG. 5) of the cutting machine 1, and therefore, the acceleration and deceleration calculator 86 of the machining time prediction device 70 is able to generate the same control pattern as the control pattern that has been generated by the acceleration and deceleration calculator 56 of the cutting machine 1. Therefore, the remaining machining time in each step in the machining time table that has been generated by the machining time calculator 88 is the same or substantially the same as the remaining machining time that has been actually required in each step that is performed by the cutting machine 1.

In this preferred embodiment, the acceleration and deceleration calculator 56 of the machining controller 53 of the cutting machine 1 performs, when generating a control pattern, S-shape acceleration control illustrated in FIG. 6B. The acceleration and deceleration calculator 86 of the simulator 83 generates the control pattern by performing S-shape acceleration control that is performed by the acceleration and deceleration calculator 56 of the cutting machine 1. As described above, the same control as S-shape acceleration control that is performed by the cutting machine 1 is performed also in the machining time prediction device 70, and thus, it is possible to further reduce an error between the remaining machining time that has been predicted by the machining time prediction device 70 and the actual remaining machining time that has been required by the cutting machine 1.

In this preferred embodiment, the acceleration and deceleration calculator 56 of the machining controller 53 of the cutting machine 1 performs, when generating a control pattern, smoothing control illustrated in FIG. 7B. The acceleration and deceleration calculator 86 of the simulator 83 generates a control pattern by performing smoothing control that is performed by the acceleration and deceleration calculator 56 of the cutting machine 1. Thus, the same control as smoothing control that is performed by the cutting machine 1 is performed also in the machining time prediction device 70, and thus, it is possible to further reduce an error between the remaining machining time that has been predicted by the machining time prediction device 70 and the actual machining time that has been required by the cutting machine 1.

In this preferred embodiment, the machining time calculator 88 of the machining time prediction device 70 calculates the data size of the processed machining program for each step of the machining program and records the remaining machining time for the data size of the processed machining program in the machining time table. The machining time acquirer 89 acquires the data size of the machining program from a start of cutting to a step that is currently performed and acquires the remaining machining time for the data size of the machining program, which has been acquired, from the machining time table. Thus, based on the data size of the processed machining program, the machining time prediction device 70 is able to determine which step of the machining program the cutting machine 1 currently performs.

In this preferred embodiment, the total data size of the machining program has been stored in the storage 82 of the machining time prediction device 70 in advance. The end determiner 92 of the machining time prediction device 70 compares the data size of the processed machining program, which has been acquired by the machining time acquirer 89, and the total data size of the machining program to one another. Then, if the data size of the processed machining program, which has been acquired by the machining time acquirer 89, matches the total data size of the machining program, the end determiner 92 terminates control in which the remaining machining time is displayed on the display screen 72 by the display controller 90. Thus, in accordance with simple procedures in which the data size of the processed machining program and the total data size of the machining program are compared to one another, it is possible to determine whether or not cutting of the workpiece 15 (see FIG. 3) of the cutting machine 1 has ended.

As described above, the storage 52, the machining controller 53 (the machining program interpreter 54 and the acceleration and deceleration calculator 56), and the control signal transmitter 58 of the controller 50 of the cutting machine and the storage 82, the simulator 83 (the machining program interpreter 84 and the acceleration and deceleration calculator 86), the machining time calculator 88, the machining time acquirer 89, the display controller 90, and the end determiner 92 of the controller 74 of the machining time prediction device 70 may be software, for example. That is, each of the above-described elements may be configured such that a computer program is read by a computer to realize each of the above-described elements. A preferred embodiment of the present invention includes a computer program that causes a computer to function as each of the above-described elements. Also, a preferred embodiment of the present invention includes a computer-readable recording medium in which the computer program is recorded. Also, each of the above-described elements may be realized by a circuit or circuits in the cutting system 100.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A machining time prediction device that predicts, in a cutting machine including a spindle that rotates a machining tool and a holder that holds a workpiece and is movable relative to the spindle and cuts the workpiece using the machining tool, based on a machining program including a plurality of process steps, remaining machining time during which the workpiece is cut, the machining time prediction device comprising:
    a display screen; and
    a controller coupled to the display screen and including:
        a storage in which the machining program is stored;
        a simulator that performs a simulation in which the cutting machine cuts the workpiece in accordance with the machining program to generate a control pattern in which control information of the spindle and the holder is recorded;
        a machining time calculator that calculates, based on the control pattern, remaining machining time in each step of the machining program and generates a machining time table in which the remaining machining time for each step of the machining program is recorded;
        a machining time acquirer that acquires a step of the machining program cutting of which is performed by the cutting machine at a current time point and acquires the remaining machining time for the step of the machining program, which has been acquired, from the machining time table; and
        a display controller that displays the remaining machining time that has been acquired by the machining time acquirer on the display screen, wherein
    the simulator includes:
        a machining program interpreter that calculates positional information of the spindle and the holder in each step of the machining program; and
        an acceleration and deceleration calculator that generates the control pattern from the positional information by calculating acceleration when the spindle and the holder move.

2. The machining time prediction device according to claim 1, wherein, when generating the control pattern, the simulator performs S-shape acceleration control.

3. The machining time prediction device according to claim 1, wherein, when generating the control pattern, the simulator performs smoothing control.

4. A machining time prediction device that predicts, in a cutting machine including a spindle that rotates a machining tool and a holder that holds a workpiece and is movable relative to the spindle and cuts the workpiece using the machining tool, based on a machining program including a plurality of process steps, remaining machining time during which the workpiece is cut, the machining time prediction device comprising:
    a display screen; and
    a controller coupled to the display screen and including:
        a storage in which the machining program is stored;
        a simulator that performs a simulation in which the cutting machine cuts the workpiece in accordance with the machining program to generate a control pattern in which control information of the spindle and the holder is recorded;
        a machining time calculator that calculates, based on the control pattern, remaining machining time in each step of the machining program and generates a machining time table in which the remaining machining time for each step of the machining program is recorded;
        a machining time acquirer that acquires a step of the machining program cutting of which is performed by the cutting machine at a current time point and acquires the remaining machining time for the step of the machining program, which has been acquired, from the machining time table; and
        a display controller that displays the remaining machining time that has been acquired by the machining time acquirer on the display screen, wherein the machining time calculator calculates a data size of a processed machining program for each step of the machining program and records remaining machining time for the data size of the processed machining program in the machining time table; and the machining time acquirer acquires the data size of the machining program from a start of cutting to a step that is currently performed by the cutting machine and acquires the remaining machining time for the data size that has been acquired from the machining time table.

5. The machining time prediction device according to claim 4, wherein a total data size of the machining program is stored in the storage in advance; and the controller includes an end determiner that compares the data size that has been acquired by the machining time acquirer and the total data size to one another and terminates, if the data size that has been acquired by the machining time acquirer and the total data size match one another, control in which remaining machining time is displayed on the display screen.

6. The machining time prediction device according to claim 4, wherein, when generating the control pattern, the simulator performs S-shape acceleration control.

7. The machining time prediction device according to claim 4, wherein, when generating the control pattern, the simulator performs smoothing control.

8. A cutting system comprising:

a machining time prediction device that predicts, in a cutting machine including a spindle that rotates a machining tool and a holder that holds a workpiece and is movable relative to the spindle and cuts the workpiece using the machining tool, based on a machining program including a plurality of process steps, remaining machining time during which the workpiece is cut, the machining time prediction device including:

a display screen; and a controller coupled to the display screen and including:

a storage in which the machining program is stored;

a simulator that performs a simulation in which the cutting machine cuts the workpiece in accordance with the machining program to generate a control pattern in which control information of the spindle and the holder is recorded;

a machining time calculator that calculates, based on the control pattern, remaining machining time in each step of the machining program and generates a machining time table in which the remaining machining time for each step of the machining program is recorded;

a machining time acquirer that acquires a step of the machining program cutting of which is performed by the cutting machine at a current time point and acquires the remaining machining time for the step of the machining program, which has been acquired, from the machining time table, and a display controller that displays the remaining machining time that has been acquired by the machining time acquirer on the display screen, wherein the cutting machine is coupled to the machining time prediction device;

the cutting machine includes a machining controller that generates a control pattern in which control information of the spindle and the holder is recorded in accordance with the machining program; and the control pattern that has been generated by the machining controller and the control pattern that has been generated by the simulator are the same.

9. The cutting system according to claim 8, wherein the simulator artificially performs a same control as a control of the machining controller.

* * * * *